United States Patent [19]
Itria et al.

[11] 4,087,780
[45] May 2, 1978

[54] OFFSHORE MARINE SEISMIC SOURCE TOW SYSTEMS AND METHODS OF FORMING

[75] Inventors: Oswald A. Itria, Bellaire; James D. Todd, Houston, both of Tex.

[73] Assignee: Texaco Inc., New York, N.Y.

[21] Appl. No.: 700,245

[22] Filed: Jun. 28, 1976

[51] Int. Cl.² ............................................. G01V 1/28
[52] U.S. Cl. .................................. 340/7 R; 340/3 T; 114/244; 114/246
[58] Field of Search ................. 340/7 R, 3 T, 7 PC, 340/15.5 MC; 144/244, 245, 246

[56] References Cited

U.S. PATENT DOCUMENTS

| | | | |
|---|---|---|---|
| 3,506,955 | 4/1970 | Backus et al. | 340/7 R |
| 3,581,273 | 5/1971 | Hedberg | 340/7 PC |
| 3,840,845 | 10/1974 | Brown | 340/7 R |
| 3,906,352 | 9/1975 | Parker | 340/7 R |
| 3,921,124 | 11/1975 | Payton | 340/7 R |

*Primary Examiner*—Howard A. Birmiel

*Attorney, Agent, or Firm*—Carl G. Ries; Thomas H. Whaley; Theron H. Nichols

[57] ABSTRACT

Two modifications of an offshore marine seismic energy source tow system are disclosed. Both systems comprise transmitters and receivers therein for continuously measuring the distance between a vessel towed submerged geophone streamer cable and a towed seismic air gun supporting paravane on each side of the streamer cable for generating and transmitting corrective steering signals to the paravane for maintaining each seismic air gun spaced from the towed submerged geophones at an exact predetermined distance for producing more accurate seismic velocity measurements. One embodiment has the acoustic transmitter on the geophone streamer cable and an acoustic receiver on each paravane in line with the transmitter, and a second embodiment has an acoustic transmitter on each paravane and a corresponding acoustic receiver for each paravane on the geophone streamer cable transversely of the transmitter. Methods for assembling the above two systems are disclosed.

12 Claims, 8 Drawing Figures

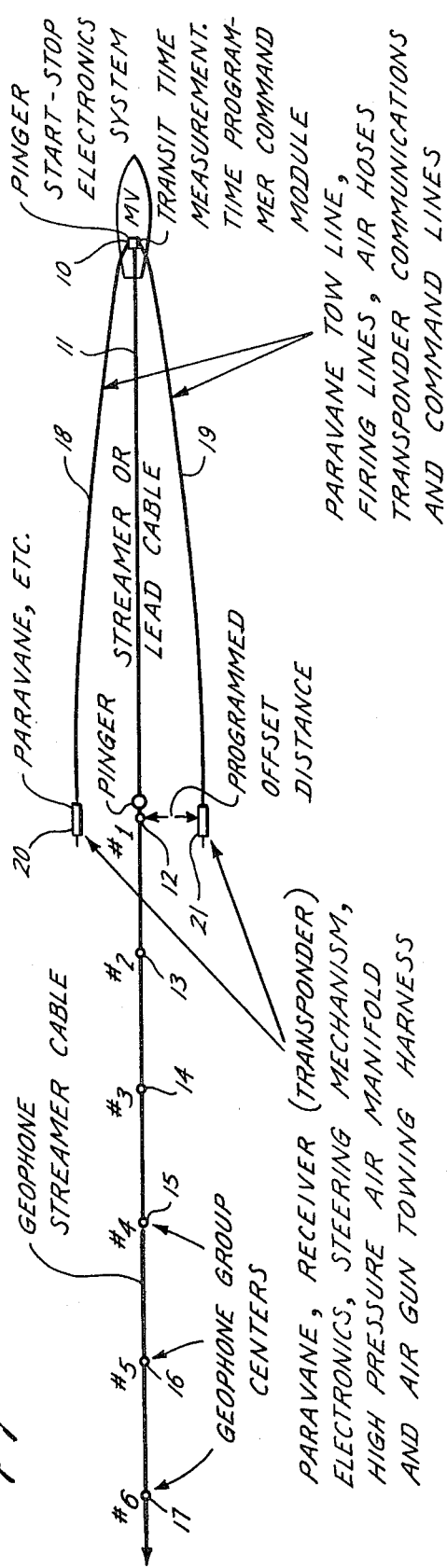
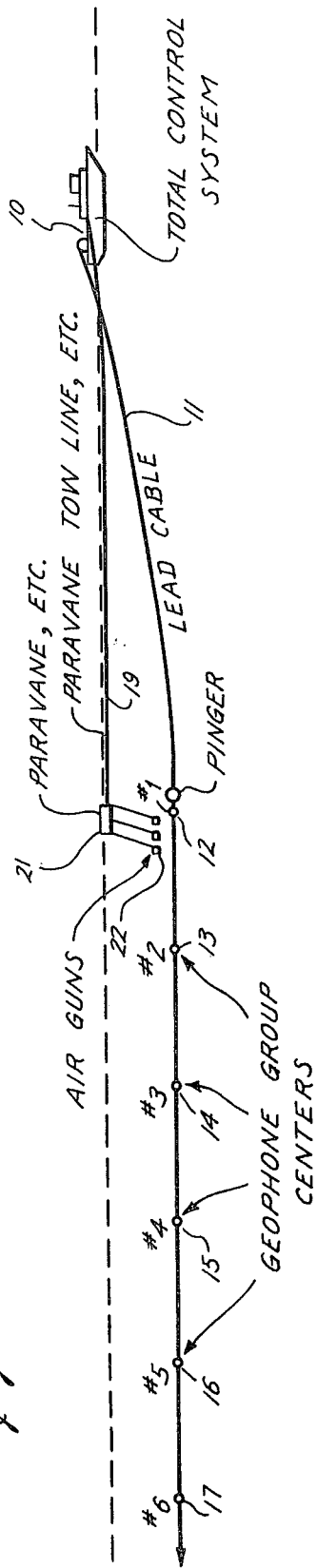

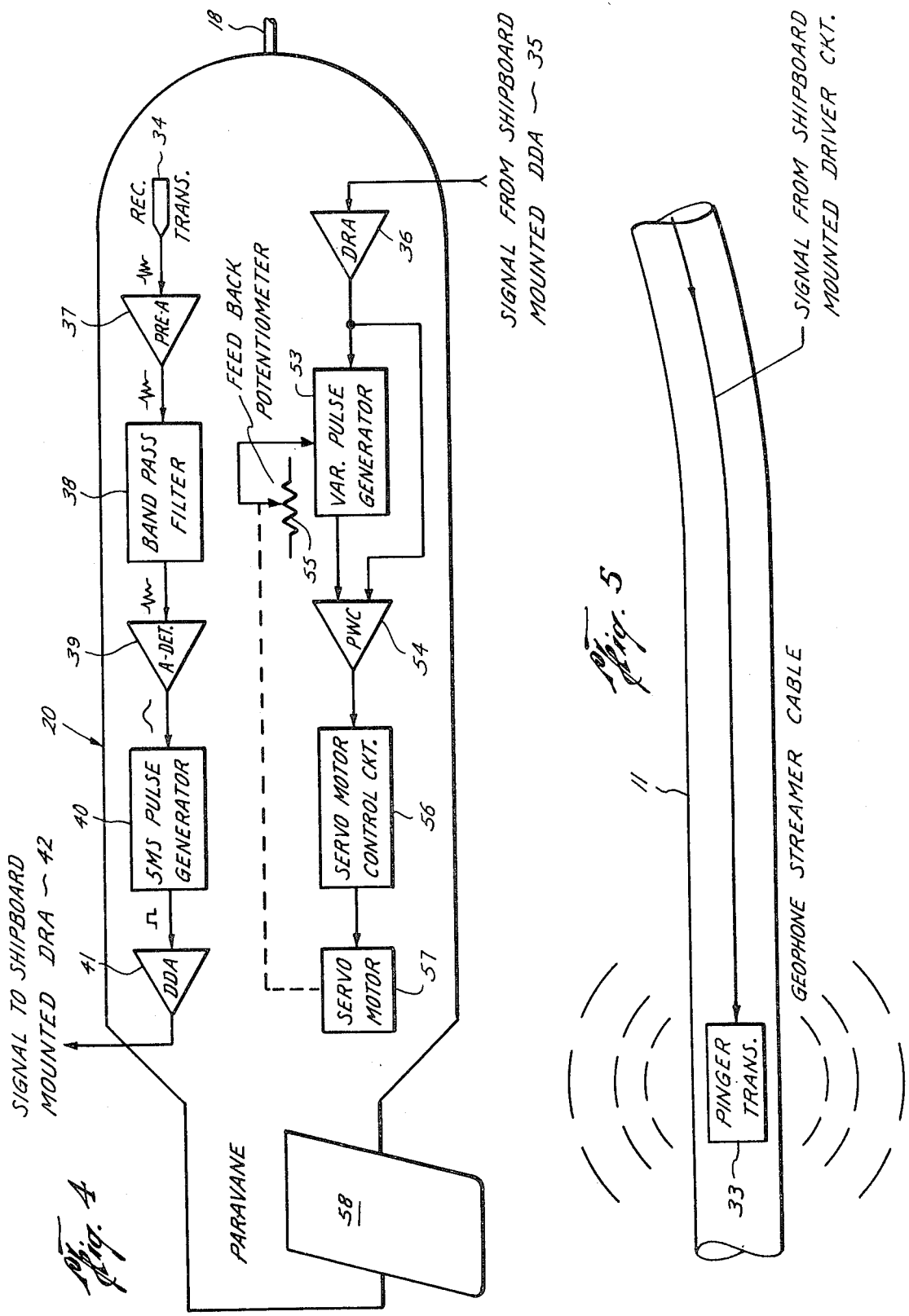

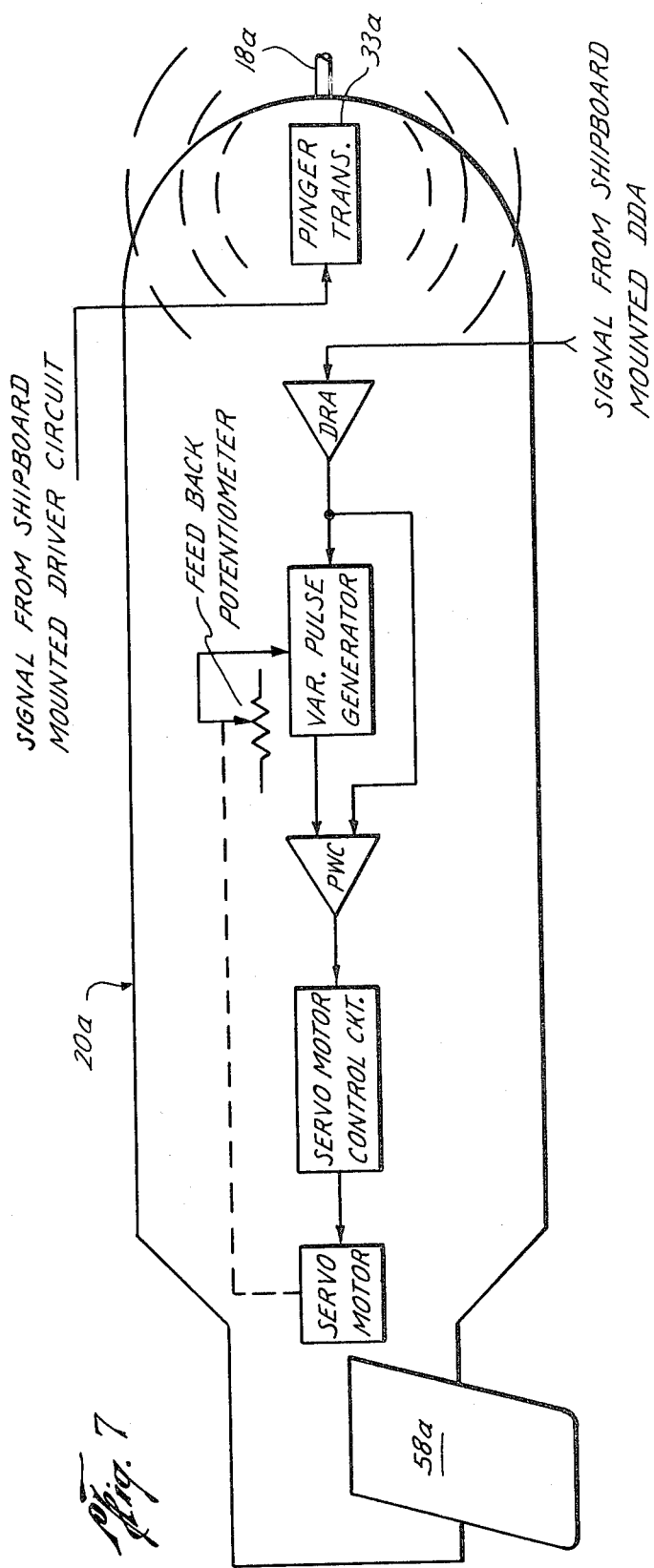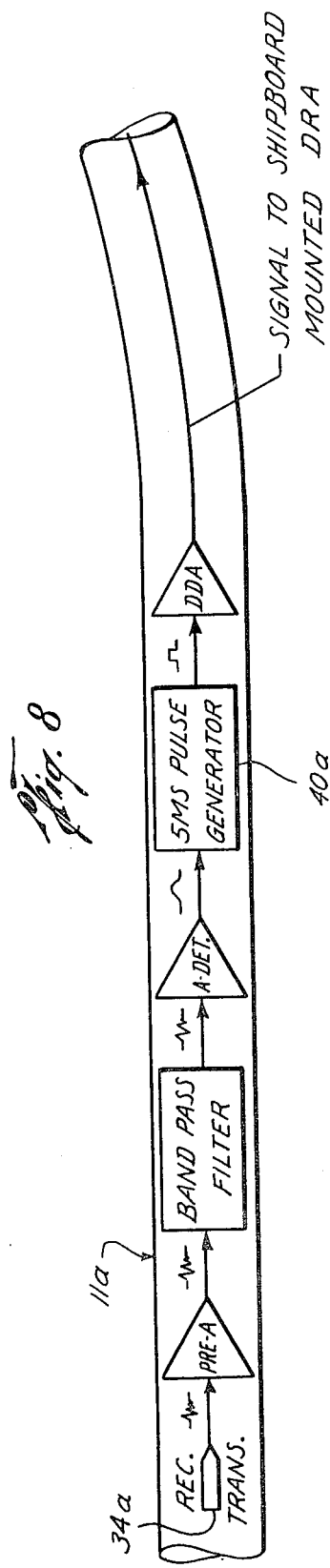

OFFSHORE MARINE SEISMIC SOURCE TOW SYSTEMS AND METHODS OF FORMING

BACKGROUND OF THE INVENTION

The search for hydrocarbons is being pursued on a worldwide scale which includes most of the potentially prospective, water-covered, sedimentary basins. Many of these water-covered areas represent relatively new, unexplored basins where little is now known about the sedimentary section. The present state of seismic technology permits extraction of stacking velocities from seismic reflection data which, when converted to interval velocities, can under certain conditions be related in a gross way to rock types. In other words, there are occasions when it is possible to associate seismic velocities with the rock types which make up the sedimentary section. However, the accuracy of these velocity measurements is critically dependent upon a number of factors, some of which are listed as follows:
1. Seismic reflection data quality.
2. Signal-to-noise ratio.
3. Water bottom geometry.
4. Subsurface structural geometry.
5. Statics.
6. Accuracy of $T_o$ measurements derived from fitting hyperbolae to the reflection data.

The present procedure for recording offshore marine seismic reflection data includes a seismic source towed along side of or immediately behind the recording boat and a streamer geophone cable which is usually a mile or more in length, made up of 24 to 96 spaced geophone groups and with the geophone group located nearest the boat positioned 200 to 500 meters behind the towed seismic source. This arrangement introduces a significant in-line offset between source to first receiver. When recording reflection data this offset can produce a degree of uncertainty in the determined $T_o$'s used in the velocity calculations. Furthermore, towing the seismic source and geophone cable close to the boat introduces undesirable source generated noise and boat generated noise in the seismic data, particularly on those critically located, short range geophone groups.

A new mechanism for reducing the source-to-receiver in-line offset and simultaneously for moving the seismic source away from the recording boat is disclosed below.

While an offshore seismic exploration method is disclosed in assignee's prior U.S. Pat. No. 3,774,021 of July 3, 1973, involving simultaneous running of a deep-reflection profile and a shallow-reflection profile without substantial interference of one with the other, this invention pertains to two modifications of a marine seismic source two system for maintaining each seismic air gun spaced from the towed submerged geophones at an exact predetermined distance for producing more accurate seismic velocity measurements.

Also, while two weighting devices are illustrated for positioning a string of geophones on a cable in U.S. Pat. No. 3,187,831, no controllable paravanes are disclosed responsive to distance measuring signals. Another method of seismic exploration utilizing paravanes which will hold a preset depth is disclosed in U.S. Pat. No. 3,331,050.

OBJECTS OF THE INVENTION

A primary object of this invention is to provide a marine seismic source tow systems that maintains a submerged seismic air gun spaced transversely of a submerged geophone streamer cable at a precise predetermined distance for producing more accurate seismic velocity measurements.

Another primary object of this invention is to provide a method for assembling a seismic source tow system having more accurate seismic velocity measurements.

Still another object of this invention is to provide a marine seismic source tow system that comprises a steerable seismic air gun supporting paravane responsive to distance measuring acoustic signals transmitted and received between the paravane and a submerged geophone streamer cable for being maintained at a precise predetermined distance from the geophone streamer cable for producing more accurate seismic velocity measurements.

A still further object of this invention is to provide at least two embodiments of a marine seismic source two system that maintains a submerged seismic air gun spaced transversely of a submerged geophone streamer cable at an exact predetermined distance for producing more accurate seismic velocity measurements.

A further object of this invention is to provide a superior marine seismic source tow system that is easy to operate, is of simple configuration, is economical to build and assemble, and is of greater efficiency for the producing of more accurate seismic velocity measurements.

Other objects and various advantages of the disclosed marine seismic source two system will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, a few forms or mechanisms that may be formed by the methods of the invention wherein like reference numerals have been employed to indicate similar parts in the several views in which:

FIG. 1 is a schematic plan view of one embodiment of the offshore marine seismic source tow system;

FIG. 2 is a front or horizontal view of the embodiment of FIG. 1;

FIG. 4 is a detailed schematic plan view of the steerable paravane of FIG. 1;

FIG. 5 is a detailed schematic side view of the geophone streamer cable of FIG. 1;

FIG. 7 is a detailed schematic plan view of the steerable paravane of the modification of FIG. 6; and FIG. 8 is a detailed schematic side view of geophone streamer cable of the modification of FIG. 6.

DESCRIPTION OF THE INVENTION

The invention disclosed herein, the scope of which being defined in the appended claims, is not limited in its application to the details of construction and arrangement of parts shown and described that may be assembled by the disclosed methods, since the invention is capable of other embodiments formed by other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE METHODS

This invention comprises a few methods for assembly of a seismic source tow system and a few tow systems formed by the methods.

METHODS FOR CONSTRUCTING A SEISMIC SOURCE TOW SYSTEM

A basic method for assembling a seismic source tow system may comprise, (1) attaching to a tow vessel a submerged geophone streamer cable having a plurality of spaced apart geophones thereon for being pulled over water covered sedimentary basins, (2) attaching to the tow vessel a steerable paravane supporting a seismic energy source positioned laterally at a predetermined distance from the lead geophone, (3) mounting on the steerable paravane a paravane positioning means responsive to corrective steering signals for controlling the position of the steerable paravane relative to the lead geophone, (4) mounting on the tow vessel paravane control means for transmitting and receiving signals between the steerable paravane means and the lead geophone on the geophone streamer cable means for measuring the distance therebetween, and (5) forming in the paravane control means additional means for generating and transmitting corrective steering signals to the paravane positioning means for maintaining the seismic energy source means spaced from the lead geophone at the precise predetermined distance for producing more accurate seismic velocity measurements.

The above method may be modified by adding the following three steps to the above basic five method steps for forming a seismic source tow system like that disclosed in FIGS. 1-5, (1) mounting a signal transmitter on the lead geophone, (2) mounting a signal receiver on the steerable paravane, and (3) connecting the geophone mounted transmitter and the paravane mounted receiver to the tow vessel paravane control means for transmission and receipt of signals between the steerable paravane means and the lead geophone for measuring the distance therebetween.

Figure 6:
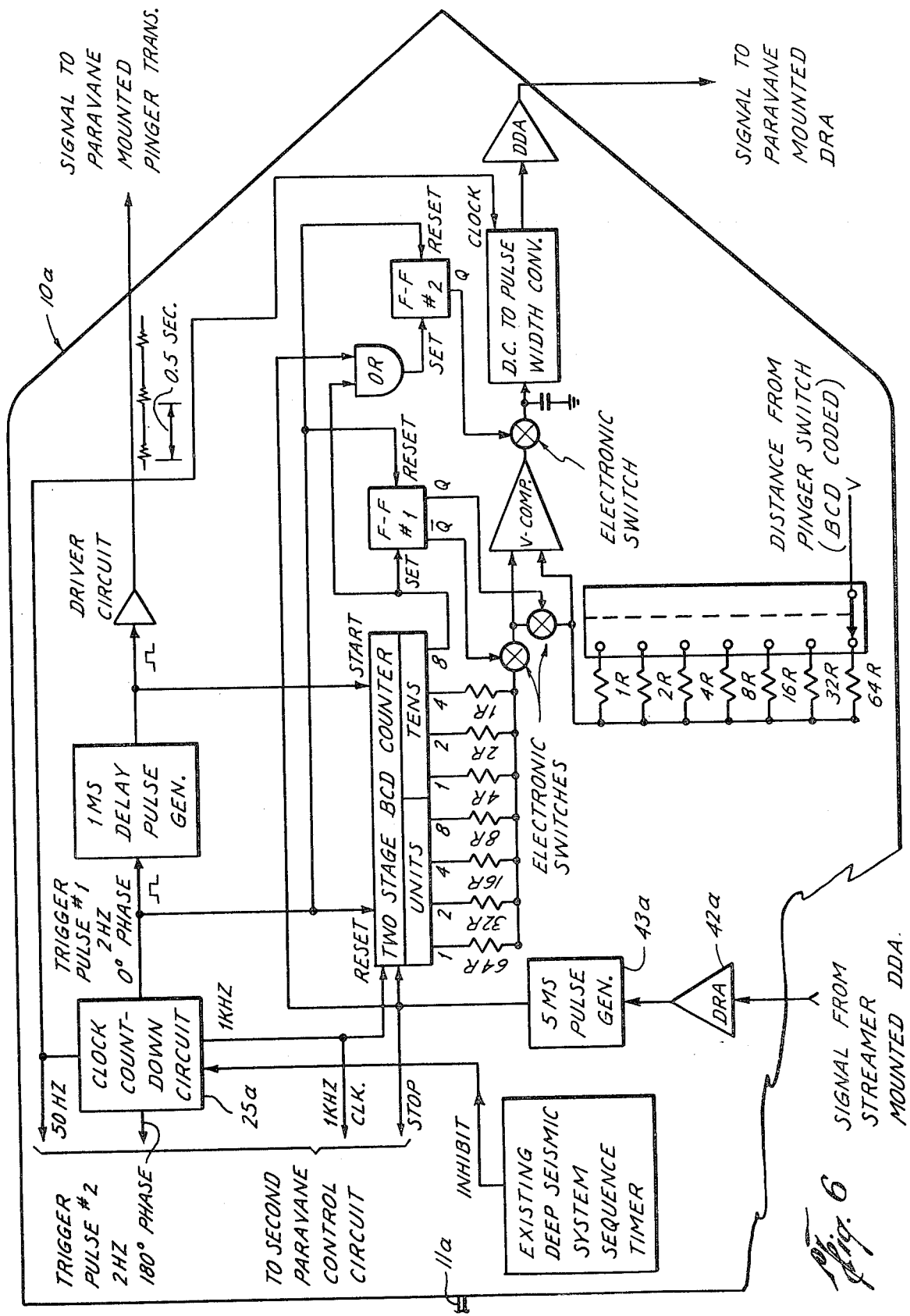
FIG. 6 is a detailed schematic plan view of a second embodiment of the offshore marine seismic source tow system.

The above basic method may be modified for forming a seismic source tow system as disclosed in FIGS. 6-8, by adding the following three steps to the basic method, (1) mounting a signal transmitter on the steerable paravane, (2) mounting a signal receiver on the lead geophone and (3) connecting the paravane mounted transmitter and the geophone mounted receiver to the tow vessel paravane control means for transmitting and receiving of signals between the steerable paravane means and the lead geophone for measuring the distance therebetween.

DESCRIPTION OF AN APPARATUS

While various marine seismic source tow systems may be utilized and constructed by the inventive methods, FIGS. 1-5 illustrate one inventive apparatus for being assembled by the methods described above, and FIGS. 6-8 illustrate a second inventive apparatus.

FIRST EMBODIMENT OF FIGS. 1-5

Briefly, FIG. 1, a top view, and FIG. 2, a side view, disclose a boat 10 pulling a submerged geophone streamer cable 11 having groups of geophones 12 to 17 thereon and two paravane tow lines 18 and 19, each line having a steerable paravane 20 and 21, respectively, attached thereto and each supporting one or more air guns, such as the three air guns 22a, 22b, and 22c illustrated as being supported by paravane 21. Any suitable seismic energy source or air gun 22 may be utilized, such as but not limited to one of those disclosed in Assignee's U.S. Pat. No. 3,923,122 of Dec. 2, 1975. A principal feature of the invention is a mechanism in combination with the marine seismic source tow system for maintaining the air guns spaced from the geophone groups at a constant, precise, and predetermined distance for producing more accurate seismic velocity measurements. This mechanism comprises basically a transmitter, a receiver, and electrical interconnections on the boat 10 for continually measuring the lateral or transverse distance of separation between the air guns 22 or actually the paravanes 20 and 21 and the geophone groups 11-17 or streamer cable 11 and sending corrective steering signals to the steerable paravanes proportional to the distance each paravane is less than or greater than the original predetermined distance of separation between each paravane (or its air gun) and the geophone groups (or the streamer cable). The geophone groups are maintained at the exact predetermined depth by towing them through the water at a precise speed, the geophones themselves being weighted and balanced to have the same specific gravity as the water they are immersed and towed in. Further, the geophone cable may be maintained at the precise depth with a conventional submerged paravane that maintains a preset depth. And other methods may be used.

The critical problem solved here is to maintain the lateral or transverse distance between the air guns and geophones at a constant, precise, predetermined amount for producing the most accurate seismic velocity measurements.

Figure 3:
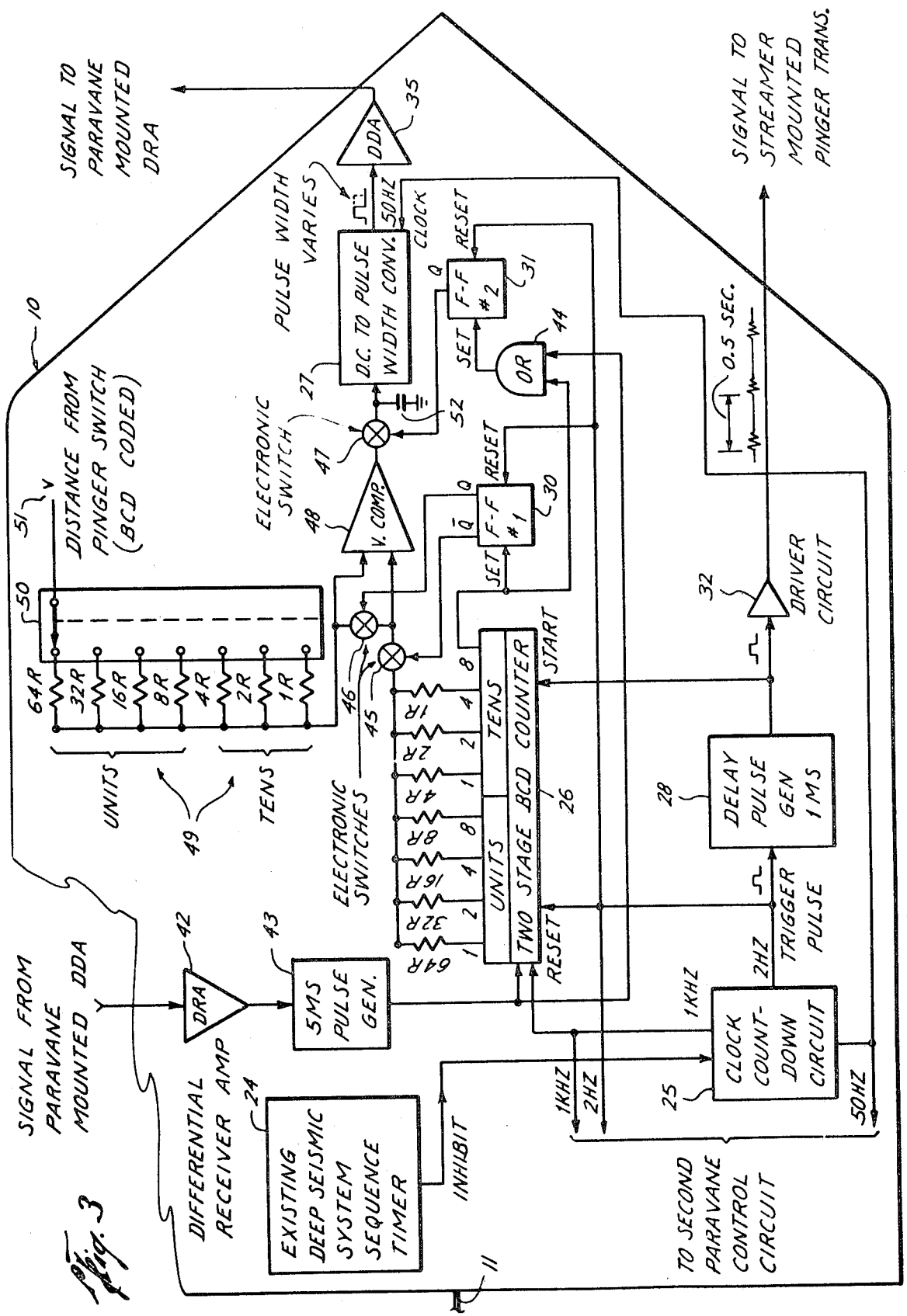
FIG. 3 is a detailed schematic plan view of the tow boat in the embodiment of FIG. 1.

More specifically, FIG. 3, on the boat 10, the existing conventional Deep Seismic System Sequence Timer 24 at the back of the boat is connected to transmit input signals to a Clock and Count-down Circuits 25. All elements described and listed below are conventional parts of the novel combination. The latter Circuits 25 are connected to transmit a 1 Khz (kilo-hertz) clock signal to a two-stage BCD (binary coded decimal) Counter 26, a 50 Hz signal to a D.C. to Pulse Width Converter 27, and a 2 Hz Trigger Pulse to the 1 ms (millisecond) Delay Pulse Generator 28, to the Reset input of a two-stage BCD Counter 26, and to the Reset input of Flip Flop Switch #2, 31, and the Reset input of Flip Flop #1, 30. The output of the 1 ms Delay Pulse Generator 28 connects to an acoustical transmitter or pinger driver circuit 32 and to the start input of a BCD Counter 26. The transmitter Driver Circuit 32 has an electrical connection through the streamer or geophone lead cable 11 to an Accoustical Transmitter 33 thereon, FIG. 5. The Acoustical Transmitter 33 is acoustically coupled through the water to the Acoustic Receiver Transducer 34, FIG. 4, mounted on the left paravane 20 for example.

A Differential Driver Amplifier 35, FIG. 3, on the boat sends a signal to a paravane mounted Differential Driver Amplifier 36, FIG. 4. The Acoustical Receiver Transducer 34 is connected to a Pre-Amplifier 37 which is electrically connected to a Band pass Filter 38. The latter filter 38 is connected to an Amplifier/Detector 39 which is connected to a 5 ms Pulse Generator 40. The Pulse Generator 40 is connected to a Differential Driver Amplifier 41 which in turn is connected through the paravane Tow Line 18 to a shipboard Differential Receiver Amplifier 42.

The latter Differential Receiver Amplifier 42, FIG. 3, is connected to a 5 ms Pulse Generator 43 which is connected to both the stop-input of the Counter 26 and one input of an OR Gate 44. The latter Gate 44 is connected to a Set input of Flip Flop #2, 31. The two-stage Counter 26, FIG. 3, connects its units and tens outputs, 1-8 and 1-4, respectively, to seven resistors, the valves of which are 1R (resistance), 2R, 4R, 8R, 16R, 32R, and 64R. An 8 output of Counter 26 is connected to a Set input of Flip Flop #1, 30 and to one input of the OR Gate 44. Flip Flop #1 or 30 has both a Q output connected to a control input of Electronic Switch #1 or 45 and a Q output connected to a control input of Electronic Switch #2 or 46. Flip Flop#2 or 31 Q output is connected to a control input of Electronic Switch #3 or 47. The seven resistors of two-stage BCD Counter 26 are connected in parallel to an input of the Electronic Switch #1 or 45, while the output of latter switch 45 is connected to both an input of the Electronic Switch #2 or 46 and to one input of a Voltage Comparator 48. The output of Electronic Switch #2 or 46 is connected both to one input of the Voltage Comparator 48 and to a junction of seven resistors 49, the values of which are R1a, R2a, R4a, R8a, R16a, R32a, and R64a. These seven resistors 49, FIG. 3, are connected to a "Distance-from-Transmitter" Switch 50. This latter switch 50 is connected to an electrical voltage source 51. The output of Voltage Comparator 48, FIG. 3, is connected to an input of Electronic Switch #3 or 47, and the output of the latter switch 47 is connected to both a capacitor C or 52 and to a control input of the D.C.-to-Pulse Width Converter 27. The other lead of capacitor 52 is connected to a ground or Logic Common. The output of the D.C.-to-Pulse Width Converter 27 is connected to an input of Differential Driver Amplifier (D.D.A.) 35.

The output from D.D.A. 35, FIG. 3, is connected through the paravane tow line or cable 18 to the input of the Differential Receiver Amplifier (D.R.A.) 36, FIG. 4. The output of the D.R.A. 36 is connected to both a control input of a Variable Pulse Generator 53 and to one of the inputs of a Pulse Width Comparator 54. The output of the Variable Pulse Generator 53 is connected to the other input of the Pulse Width Comparator 54. The pulse width control input of the Variable Pulse Generator 53 is connected to a Feed Back Potentiometer 55. This Potentiometer 55 is mechanically linked to a Servo Motor 57. The output of the Pulse Width Comparator 54 is connected to a Servo Motor Control Circuit 56 which in turn is also connected to the Servo Motor 57. The Servo Motor 57 is mechanically linked to the Feed Back Potentiometer 55 and paravane steering vane mechanism 58 for controlling lateral movement of the paravane in the correct direction.

OPERATION OF THE FIRST EMBODIMENT OF FIGS. 1-5

All components used herein are conventional.

The clock and Count-Down Circuit (C.C.C.) 25, FIG. 3, provides the timing for the entire electronics of this system. The C.C.C. provides a 1 kHz clock signal for the BCD Counter 26 and a 50 Hz clock signal for the D.C. to Pulse Width Converter 27. The C.C.C. 25 also provides a 2 Hz trigger pulse to reset the BCD Counter 26 to zero, and a reset for Flip Flops #1 and #2, 30 and 31, respectively, at the beginning of the pinging or transmitting cycle. Flip Flop #1, 30, then sets Electronic Switch #1, 45, closed and Electronic Switch #2, 46, open. Flip Flop #2, 31, sets Electronic Switch #3, 47, open. Capacitor C or 52 will retain its present change for approximately 100 ms or so. The 2 Hz trigger pulse is inhibited during a deep seismic record by that system's Sequence Timer, such as, but not limited to the sequence timer disclosed in Assignee's U.S. Pat. No. 2,849,211.

The trigger pulse from clock circuit 25, FIG. 3, also activates the Delay Pulse Generator 28 which sends a 1 ms pulse to start the BCD Counter 26 counting in 1 ms steps. Also, the pinger or transmitter driver circuit 32 is activated which in turn sends a burst of 50 kHz signal to the pinger transmitter 33 mounted on the Geophone Streamer cable 11.

The acoustical or pinger transmitter 33, FIG. 5, emits acoustical energy into the water which is picked up by the Receiver Transducer 34, FIG. 4, mounted on one of the paravanes 20. The Receiver Transducer may be one of many crystalline types available commercially. The short burst of acoustic energy is converted by the Receiver Transmitter 34 into an electrical signal and passed on to the Pre-Amplifier 37. The Pre-Amplifier increases the signal level sufficiently and then passes it on to the Band Pass Filter 38 where all unwanted frequencies above and below the Acoustical or Pinger frequency are rejected. From here the signal goes to the Amplifier and Detector Circuit 39 where high frequency burst of signal is converted into a DC pulse representing the envelope of the burst. From here this DC pulse is converted to a 5 ms pulse by the Pulse Generator 40 and then sent to the Differential Driver Amplifier (D.D.A.) 41. D.D.A's are used in this system to give high common mode rejection over the long wire lengths involved. The 5 ms signal is sent from the paravane mounted D.D.A. 41, FIG. 4, to the shipboard D.R.A. (Differential Receiver Amplifier) 42, FIG. 3, via the paravane tow cable 18.

The D.R.A. 42, FIG. 3, is part of the common mode rejection scheme used here. From the D.R.A. the pulse is reshaped by the 5ms Pulse Generator 43 and applied to the stop input of the BCD Counter 26. With the BCD Counter now stopped a voltage proportional to the distance between the Receiver Transducer and the Pinger transmitter will appear at the junction of the ladder resistor network connected to the units and tens outputs of the counter 26. This voltage will be used as one side of the Voltage Comparator 48 to determine whether or not the paravane is in the correct position. The 5 ms Pulse Generator 43 also sets Flip Flop #2, 31, through the OR Gate 44. This in turn sets Electronic Switch #3, 47, closed.

Under normal operating conditions the Voltage Comparator 48 compares the BCD Counter ladder voltage with that set in by the "Distance from Pinger" selection switch 50. The selection switch 50 has a comparable ladder network and the switch has BCD outputs similar to the BCD Counter. The switch would be calibrated in feet rather than in time.

In the event the acoustical pulse from the paravane is not received, the 8 count from the tens output (128 ms) of the BCD Counter 26, FIG. 3, will set Flip Flops #1 and #2. Flip Flop #1, 30, in turn opens Electronic Switch #1, 45, removing the ladder network from the Voltage Comparator 48 input. Flip Flop #1 also closes Electronic Switch #2, 46, thereby connecting the two inputs of the Voltage Comparator together. With the inputs connected together the Voltage Comparator 48 functions as if the paravane is in the correct position and controls it accordingly.

The output of the Voltage Comparator 48, FIG. 3, goes to Electronic Switch #3, 47, which is now closed. The output voltage is impressed on capacitor C or 52 and the input of the D.C. to Pulse Width Converter 27. The capacitor C serves as a filter and holds up the voltage while Electronic Switch #3, 47, is opened momentarily between Reset and the receiving of a pulse from the paravane electronics. The D.C. to Pulse Width Converter 27 does just that and is clocked at a 50 Hz rate by the C.C.C. 25. The D.D.A. 35 then transfers the pulse train down the paravane tow cable assembly 18, FIG. 1, to the paravane mounted D.R.A. 36, FIG. 4. The D.R.A. 36 on paravane 20 sends the pulse on to the Variable Pulse Generator 53 and the Pulse Width Comparator 54. The Variable Pulse Generator 53 pulse width is controlled by the Feed Back Potentiometer 55 which is mechanically linked to the steering Servo Motor 57. The Pulse Width Comparator 54 now compares the two pulse widths and provides a correction signal to the Servo Motor Control Circuit 56. The Servo Motor Control Circuit in turn controls the Servo Motor 57.

It may be noted that the two-stage BCD Counter 26, FIG. 5, could be a three-stage unit, i.e. tenths, units, and tens with a clock frequency of 10 kHz. The "Distance from Pinger" Selection Switch 50 would likewise need expanding. This change would increase resolution from 5 feet to 0.5 feet.

Also there will be of necessity a second paravane control circuit (not shown) if two paravanes are used. The 2 Hz, 50 Hz, and 1 kHz signals from the C.C.C. 25, FIG. 3, will be used by this second control circuit. This second control circuit will consist of everything contained in FIGS. 3–5 with the deletion of the C.C.C., the 1 ms Delay Pulse Generator, the Driver Circuit, and the Pinger Transmitter.

SECOND EMBODIMENT OF FIGS. 6–8

FIGS. 6–8 depicts a modified offshore marine seismic source tow system wherein the Acoustical Pinger Transmitter 33a, FIG. 7, for carrying out the above described methods is mounted on the paravane 20a and the receiver 34a, FIG. 8, and its associated electronics would be mounted on or in the streamer cable 11a. The connections and the operation in this case would be similar to that of the embodiment of FIGS. 1–6 with the exception of the second 2 Hz trigger pulse from the clock count down circuit 25a, FIG. 6. This trigger pulse for the modified paravane control circuit 25a is 180° out of phase with the first modification control circuit. This allows the two transmitters 33a, FIG. 8, and 33b (not shown) on the two respective paravanes (only the left paravane 20a being shown) to alternately operate and use the same Receiver Transducer 34a to stop their respective control circuits. For a two paravane operation everything in FIGS. 5 and 7 is duplicated for the second paravane with the exception of the clock count down circuit (C.C.C) 25a, FIG. 6, all the streamer mounted components on FIG. 8, the shipboard differential receiver amplifier (D.R.A.) 42a, FIG. 6, and the shipboard 5 ms Pulse Generator 43a, FIG. 6.

Accordingly, in the embodiment of FIGS. 6–8, the acoustical transmitters 33 are mounted in the paravanes 20, 21 instead of in the geophone streamer cable 11, as in the first embodiment of FIGS. 1–5. Two advantages of this particular mounting are (1) the paravanes provide more room for ease of mounting of the acoustical transmitters therein and (2) there is less detrimental coupling of the transmitted electrical signal into the geophone streamer cable by moving the acoustical transmitters from the geophone streamer cable to the paravanes.

Obviously other methods may be utilized for forming the embodiments of either FIGS. 1–5 or FIGS. 6–8 than those listed above, depending on the particular design parameters desired for the different rock types which make up the sedimentary section.

Accordingly, it will be seen that the above disclosed embodiments of the marine seismic source tow system will operate in a manner which meets each of the objects set forth hereinbefore.

While only two methods for forming the invention and two mechanisms for being formed by the methods have been disclosed, it will be evident that various other methods and modifications are possible in the arrangement and construction of the disclosed methods and marine seismic source tow systems constructed thereby without departing from the scope of the invention and it is accordingly desired to comprehend within the purview of this invention such modifications as may be considered to fall within the scope of the appended claims.

A feature of both embodiments is that the geophones 12–17 may be towed or trailed far behind to thereby avoid interference generated by the boat.

We claim:

1. A marine seismic source tow system for ensuring accurate seismic velocity measurements comprising,
 (a) a tow vessel,
 (b) at least one geophone on a submerged geophone streamer cable means for being towed submerged at a substantial depth behind said tow vessel,
 (c) steerable paravane means pulled from behind said tow vessel,
 (d) seismic energy source means supported by said steerable paravane means and positioned laterally at a predetermined distance from said geophone,
 (e) said steerable paravane means having paravane positioning means responsive to corrective steering signals for controlling the position of said steerable paravane means relative to said geophone streamer cable means,
 (f) paravane control means for said tow vessel for transmitting and receiving signals between said steerable paravane means and said one geophone on said geophone streamer cable means for measuring the distance therebetween, and (g) said paravane control means having means for transmitting corrective steering signals to said paravane positioning means for maintaining said seismic energy source means spaced precisely from said one geophone at said exact predetermined distance for producing more accurate seismic velocity measurements.

2. A marine seismic source tow system comprising,
(a) a tow vessel,
(b) a plurality of groups of geophones spaced along a submerged geophone streamer cable means for being towed submerged at a substantial depth behind said tow vessel, a first geophone group being the lead geophone group,
(c) steerable paravane means for being pulled behind said tow vessel,
(d) seismic air gun means supported by said steerable paravane means and positioned laterally at a predetermined distance from said first geophone group,
(e) paravane positioning means for said steerable paravane means responsive to corrective steering signals for controlling the position of said steerable paravane means,
(f) paravane control means for said tow vessel for transmitting and receiving acoustic signals between said steerable paravane means and said geophone streamer cable means for measuring the distance therebetween, and
(g) said paravane control means having means for transmitting corrective steering signals to said paravane positioning means for maintaining said seismic air gun means spaced from said first geophone group at said predetermined precise distance for producing more accurate seismic velocity measurements.

3. A marine seismic source tow system comprising,
(a) a tow vessel,
(b) submerged geophone streamer cable means having at least one geophone thereon for being towed submerged at a substantial depth behind said tow vessel,
(c) steerable paravane means connected to said tow vessel and supporting seismic energy source means positioned laterally at a predetermined distance from said geophone,
(d) said steerable paravane means having receiver means,
(e) said steerable paravane means having paravane positioning means responsive to said received means for controlling said steerable paravane means,
(f) said streamer cable means having transmitting means laterally of said receiver means on said paravane means for sending acoustic positioning signals to said receiver means, and
(g) said receiver means being responsive to said transmitting means for steering said steerable paravane means precisely to said predetermined distance from said one geophone for exact positioning of said seismic energy source means relative to said geophone for providing more accurate seismic velocity measurements.

4. A marine seismic source tow system comprising,
(a) a tow vessel,
(b) submerged geophone streamer cable means having a plurality of groups of geophones spaced along the length thereof for being towed submerged at a substantial depth behind said tow vessel, a first geophone group being the lead geophone group,
(c) steerable paravane means connected to said tow vessel and supporting seismic energy source means spaced laterally at a predetermined distance from said first geophone group,
(d) said steerable paravane means having receiver means,
(e) said steerable paravane means having a paravane positioning means responsive to said receiver means for controlling said steerable paravane means,
(f) said streamer cable means having transmitting means laterally of said receiver means on said paravane means for sending signals to said receiver means, and
(g) said receiver means being responsive to said transmitting means for steering said steerable paravane means exactly to said predetermined distance from said first geophone group for precise positioning of said seismic energy source means relative to said geophone means for producing more accurate seismic velocity measurements.

5. A marine seismic source tow system comprising,
(a) a tow vessel,
(b) submerged geophone streamer cable means having at least one geophone thereon for being towed submerged at a substantial depth behind said tow vessel,
(c) steerable paravane means connected to said tow vessel and supporting seismic acoustic energy source means positioned laterally at a predetermined distance from said geophone,
(d) said steerable paravane means having acoustic receiver means,
(e) said steerable paravane means having paravane positioning means responsive to said acoustic receiver means for controlling said steerable paravane means,
(f) said streamer cable means having acoustic transmitting means laterally of said acoustic receiver means on said paravane means for sending acoustic positioning signals to said acoustic receiver means, and
(g) said acoustic receiver means being responsive to said acoustic transmitting means for steering said steerable paravane means precisely to said predetermined distance from said one geophone for exact positioning of said seismic acoustic energy source means relative to said geophone for providing more accurate seismic velocity measurements.

6. A marine seismic source tow system as recited in claim 5 wherein,
(a) said seismic acoustic energy source means includes a seismic air gun positioned laterally at said predetermined distance from said geophone and supported from said steerable paravane means.

7. A marine seismic source tow system comprising,
(a) a tow vessel having a paravane control means,
(b) at least one geophone on a submerged geophone streamer cable means for being towed submerged at a substantial depth behind said tow vessel,
(c) seismic energy source means positioned laterally at a predetermined distance from said geophone and supported by a steerable paravane means connected to said tow vessel, (d) said submerged geophone streamer cable means having receiver means connected to said tow vessel paravane control means, (e) said steerable paravane means having paravane positioning means connected to said tow vessel paravane control means and responsive to said receiver means for controlling said steerable paravane means, (f) said steerable paravane means having transmitter means laterally of said receiver means on said geophone streamer cable means for sending positioning signals to said receiver means, and (g) said receiver means being responsive to said transmitter means for steering said steerable paravane means exactly to said predetermined distance from said geophone for precise positioning of said seismic energy source means relative to said one geophone for providing more accurate seismic velocity measurements.

8. A marine seismic source tow system comprising, (a) a tow vessel, (b) submerged geophone streamer cable means having a plurality of groups of geophones spaced along the length thereof for being towed submerged at a substantial depth behind said tow vessel, a first geophone group being the lead geophone group, (c) steerable paravane means connected to said tow vessel and supporting seismic energy source means spaced laterally at a predetermined distance from said first geophone group, (d) said submerged geophone streamer cable means having receiver means connected to said tow vessel paravane control means, (e) said steerable paravane means having paravane positioning means connected to said tow vessel paravane control means and responsive to said receiver means for controlling said steerable paravane means, (f) said steerable paravane means having transmitter means laterally of said receiver means on said geophone streamer cable means for sending positioning signals to said receiver means, and (g) said receiver means being responsive to said transmitter means for steering said steerable paravane means exactly to said predetermined distance from said first geophone group for precise positioning of said seismic energy source means relative to said first geophone group for providing more accurate seismic velocity measurements.

9. A marine seismic source tow system comprising, (a) a tow vessel having a paravane control means, (b) at least one geophone on a submerged geophone streamer cable means for being towed submerged at a substantial depth behind said tow vessel, (c) seismic acoustic energy source means positioned laterally at a predetermined distance from said geophone and supported by a steerable paravane means connected to said tow vessel, (d) said submerged geophone streamer cable means having acoustic receiver means connected to said tow vessel paravane control means, (e) said steerable paravane means having paravane positioning means connected to said tow vessel paravane control means and responsive to said acoustic receiver means for controlling said steerable paravane means, (f) said steerable paravane means having acoustic transmitter means laterally of said acoustic receiver means on said geophone streamer cable means for sending acoustic positioning signals to said acoustic receiver means, and (g) said acoustic receiver means being responsive to said acoustic transmitter means for steering said steerable paravane means exactly to said predetermined distance from said geophone for precise positioning of said seismic acoustic energy source means relative to said one geophone for providing more accurate seismic velocity measurements.

10. A method for assembling a seismic source tow system having accurate seismic velocity measurements comprising, (a) attaching to a tow vessel a submerged geophone streamer cable having a plurality of spaced apart geophones thereon for being pulled over water covered sedimentary basins, (b) attaching to the tow vessel a steerable paravane supporting a seismic energy source positioned laterally at a predetermined distance from the lead geophone, (c) mounting on the steerable paravane a paravane positioning means responsive to corrective steering signals for controlling the position of the steerable paravane relative to the lead geophone, (d) mounting on the tow vessel paravane control means for transmitting and receiving signals between the steerable paravane means and the lead geophone on the geophone streamer cable means for measuring the distance therebetween, and (e) generating and transmitting in the paravane control means corrective steering signals to the paravane positioning means on the paravane for maintaining the paravane and accordingly the seismic energy source means spaced from the lead geophone at the precise predetermined distance for producing more accurate seismic velocity measurements.

11. A method as recited in claim 10 including the additional steps of, (a) mounting a signal transmitter on the lead grephone, (b) mounting a signal receiver on the steerable paravane, and (c) connecting the geophone mounted transmitter and the paravane mounted receiver to the tow vessel paravane control means for transmission and receipt of signals between the steerable paravane means and the lead geophone for measuring the distance therebetween.

12. A method as recited in claim 10 including the additional steps of, (a) mounting a signal transmitter on the steerable paravane, (b) mounting a signal receiver on the lead geophone, and (c) connecting the paravane mounted transmitter and the geophone mounted receiver to the tow vessel paravane control means for transmitting and receiving of signals between the steerable paravane means and the lead geophone for measuring the distance therebetween.

* * * * *